Oct. 14, 1958 E. R. PRICE 2,855,901
POWER BRAKING SYSTEM

Filed Aug. 6, 1956 2 Sheets-Sheet 1

INVENTOR.
EARL R. PRICE.
BY
William O. Hickey
ATTORNEY.

INVENTOR.
EARL R. PRICE.
BY
William O. Hickey
ATTORNEY.

United States Patent Office 2,855,901
Patented Oct. 14, 1958

2,855,901

POWER BRAKING SYSTEM

Earl Robert Price, South Bend, Ind., assignor to Bendix Aviation Corporation, South Bend, Ind., a corporation of Delaware Application August 6, 1956, Serial No. 602,170

10 Claims. (Cl. 121—41)

The present invention relates to force transmitting systems; and more particularly to force transmitting systems adaptable for use in power actuated automotive braking systems and the like.

An object of the present invention is the provision of a new and improved leverage system for controlling the operation of a servo-motor and for transmitting its delivered force to a driven device, which system transmits reaction from the driven device to the system's actuating member in stages.

Another object of the present invention is the provision of a new and improved leverage system of the above described type which is simple in design, rugged in construction, and efficient in its operation.

A further object of the invention is the provision of a new and improved system of the above described type comprising a first lever pivotally supported at a first point, a second lever operatively connected at a point intermediate its ends by abutment means to a second point on said first lever spaced apart from said first point, and a spring interpositioned between the levers and acting on a line of force passing through said first point to bias said abutment means out of its force transmitting condition.

Figure 1:
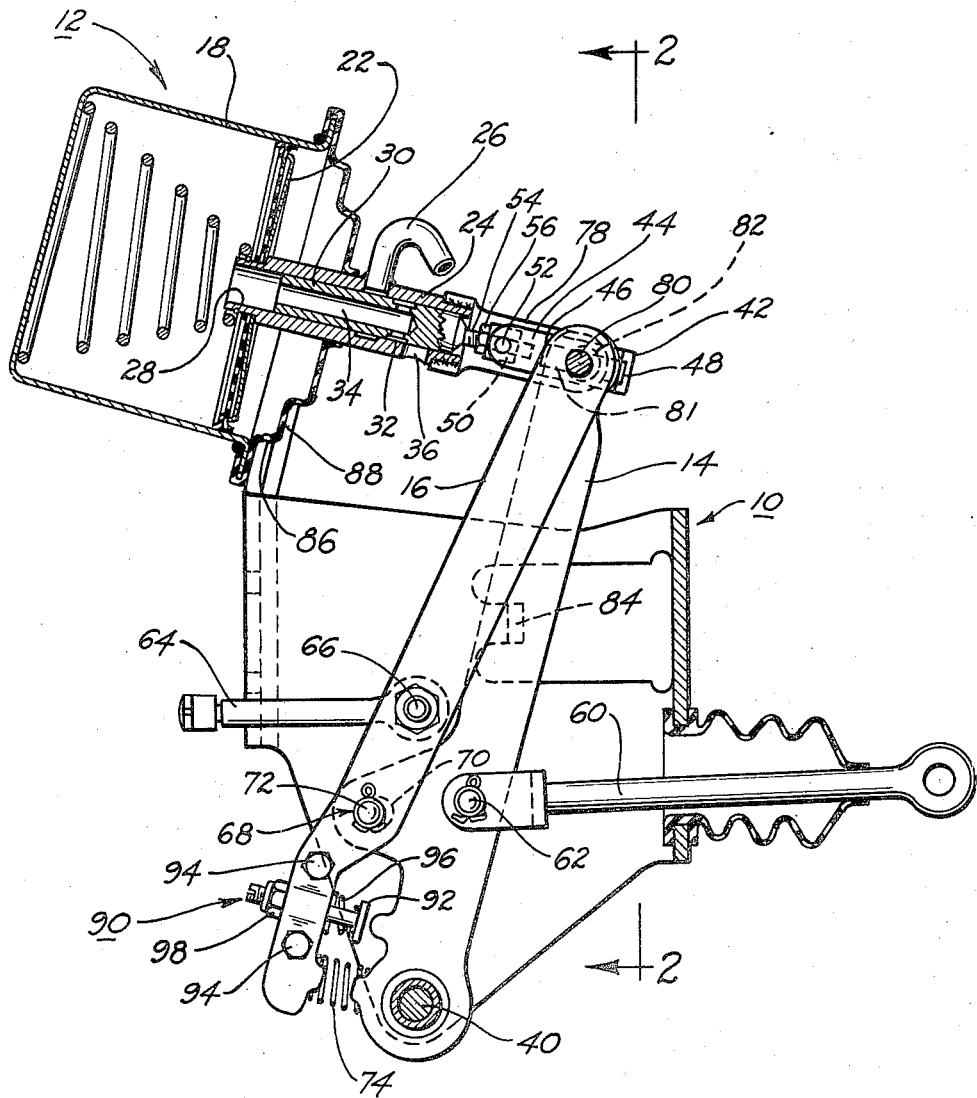
Figure 2:
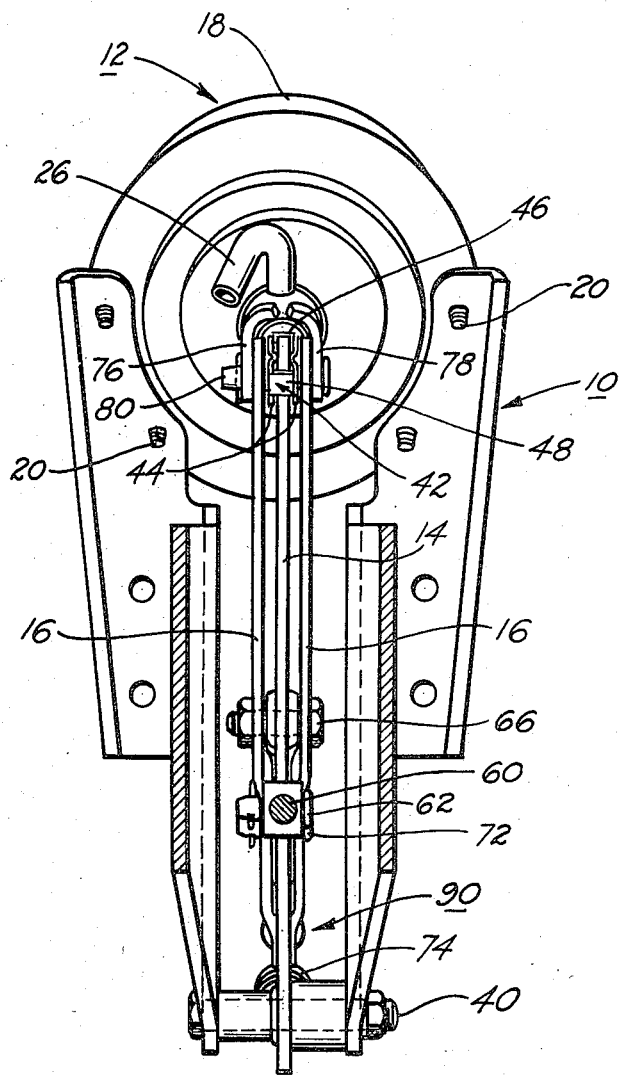

The invention resides in certain constructions and combinations and arrangements of parts, and further objects and advantages will become apparent to those skilled in the art to which the invention relates from the following description of the preferred embodiment described with reference to the accompanying drawings forming a part of this specification, and in which:

Figure 1 is a side elevational view partly in section showing a portion of an automotive braking system embodying the principles of the present invention; and Figure 2 is a sectional view taken on the lines 2—2 of Figure 1.

The portion of the automotive braking system shown in the drawing comprises a support bracket 10 on which is mounted a fluid pressure servo-motor 12 and a pair of force transmitting levers 14 and 16 adapted to control the fluid pressure servo-motor and transmit force therefrom to the driven device (which in this instance is a master cylinder of the hydraulic braking system of an automotive vehicle).

The fluid pressure servo-motor 12 comprises a cup shaped cylinder 18 fastened to the support bracket 10 by means of machine screws 20 and the open end of which faces the levers 14 and 16. The cylinder 18 is provided with an internal piston 22 having a tubular force transmitting member 24 projecting in the direction of the levers 14 and 16. A vacuum connection 26 is provided in the side walls of the tubular member 24 for communicating vacuum to the internal chamber 28 of the tubular member. The internal chamber 28 communicates directly with the back side of the power piston 22, and communication of vacuum therewith is controlled by means of a cylindrically shaped slide valve member 30 positioned in the internal chamber 28 and having passages 32 and 34 adapted to be aligned with the vacuum connection 26. An atmospheric passageway 36 is also provided in the side walls of the tubular member 24 positioned forwardly (i. e., in the direction of the levers 14 and 16) from the vacuum connection 26; and when passageway 32 of the valve member communicates therewith, atmospheric pressure will be communicated with the back side of the power piston 22. Both the vacuum connection 26 and the atmospheric passageway 36 are communicated with the back side of the power piston through valve member 30; and by sliding the valve member 30 lengthwise to communicate its passageway 32 with these openings, regulation of the pressure in the rear chamber of the servo-motor can be obtained.

Movement of the slide valve member 30 is accomplished by means of the valve lever 14 which is pivotally connected to the support bracket 10 by means of pin 40 at its lower end, and which is connected to the slide valve member 30 by an abutment member 42 at its upper end. The abutment member 42 comprises a pair of plates 44 positioned on the left and right sides of the valve lever 14 as seen in Figure 2, and the left and right plates 44 are fastened together by laterally bent portions 46 and 48 which extend through openings in the right hand plate 44, and the ends of which are riveted thereto. The plates 44 therefore form a box structure which receives motion from the valve lever 14 by reason of abutment of the bent portions 46 and 48 with the front and back edges of the valve lever 14 respectively. The box structure formed by plates 44 is adjustably connected to the valve member 30 by means of block 50 which has integrally formed laterally projecting pins 52 extending through holes in the rear end portions of the plates 44, and which block 50 is threaded onto a projection 54 of the valve member and is locked in place by a jam nut 56. Actuation of the valve lever 14, and in turn the control valve of the servo-motor, is accomplished by means of a push rod 60 one end of which is connected to the valve lever 14 by pin 62, and the other end of which is adapted to be moved by a conventional brake pedal lever (not shown) of the automobile.

The driven device in the present instance is, of course, the hydraulic master cylinder (not shown) of an automotive vehicle braking system and will normally be bolted to the left hand end of the support bracket 10 as seen in Figure 1. Force developed by the servo-motor 12 is delivered to the master cylinder by means of the force transmitting lever 16 and the push rod 64— one end of which is suitably connected to the force transmitting lever 16 as by pin 66, and the other end of which is adapted to deliver thrust to the previously referred to master cylinder. The force transmitting lever 16 is formed by a pair of spaced members, the individual members of which are positioned on opposite sides of the valve lever 14, and are operatively connected to the valve lever 14 at a point spaced upwardly from the support pin 40 of the valve lever by abutment means 68. The abutment means 68 is a lost motion connection formed by means of a slotted hole 70 in the valve lever 14 and a pin 72 carried by the left and right members of the force transmitting lever 16, which pin extends through the slotted hole 70. The bottom portions of the pair of force transmitting members, which form lever 16, project downwardly below the lost motion connection 68 into the region generally overlying the support pin 40, and a compression spring 74 is positioned between the valve and force transmitting levers 14 and 16, respectively, to bias the pin 72 against the rear end of the slotted hole 70. Compression spring 74 acts upon a line of force passing through the center of the support pin 40 for reasons which will later be explained.

Force from the piston 22 of the servo-motor is transferred to the upper end of the force transmitting lever 16 by means of a pair of similar brackets 76 and 78, respectively, one end of each of which is welded to the tubular force transmitting member 24 fixed to the piston 22, and the other end of which is fastened to the upper end of the force transmitting lever 16 by means of a pin 80 carried by the front and back brackets 76 and 78. Pin 80 is journalled in the front and back members of the force transmitting lever 16 and extends through aligned rectangular slots 81 in the abutment members 42, as well as through an enlarged hole 82 in the valve lever 14. By this expedient the valve lever 14 may be moved a sufficient distance to completely stroke the valve member 30 without moving the force transmitting lever 16. The left and right sides of the support bracket 10 are each provided with inwardly turned bent portions 84 adapted to act as a return stop for the left and right portions of the force transmitting lever 16, respectively; and the return spring for the foot pedal lever, not shown, normally biases the valve lever 14 forwardly into the position shown in Figure 1. In this position, the passageway 32 of the valve member is normally in engagement with the atmospheric passageway 36 to provide the normal atmospheric submerged condition of the servo-motor.

Actuation of the system shown is accomplished by depressing the foot pedal lever, not shown, whereby valve lever 14 will be moved rearwardly transmitting its rearward motion to the valve member 30 through abutment with the bent portion 46 of the abutment member 42. Valve actuating rearward movement of the valve lever 14 is not transmitted to pin 80 by reason of the enlarged hole 82 in the valve lever 14. Backward movement of the valve member 30 causes its passage 32 to be communicated with the vacuum connection 26 to thereby communicate vacuum with the back side of the power piston 22. The front side of the power piston 22 is of course always subjected to atmospheric pressure by reason of a hole 86 in the rubber dirt seal 88; and the differential pressure across the piston 22 causes it to move rearwardly. Rearward movement of the piston 22 is transmitted through the tubular member 24 and the brackets 76 and 78 to pin 80 by reason of the tight fit therebetween. The force exerted upon the force transmitting lever 16 by the servo-motor causes the top portion of the lever 16 to move rearwardly. Rearward movement of the lever 16 causes the push rod 64 to move rearwardly until sufficient reaction is produced by the master cylinder of the vehicle to cause the lever 16 to pivot about pin 66.

Neglecting for the time being the functioning of the yieldable abutment device 90 which has not as yet been described, pivotal movement of the force transmitting lever 16 about the pin 66 gradually compresses spring 74 and causes the pin 72 of the lost motion connection 78 to move forwardly toward the forward end of the slotted hole 70. It will be seen that during this period of forward movement of the pin 72 in the slotted hole 70, no reactive force will be transmitted to the valve actuating lever 14 by reason of the fact that compression spring 74 acts on the line of force passing through the center of the support pin 40. By reason of this expedient therefore, the initial force applied to the master cylinder and in turn the reaction transmitted back to the force transmitting lever 16 does not transmit reaction back to the foot pedal lever of the vehicle until such time as spring 74 has compressed a sufficient amount to permit the pin 72 to abut the forward end of the slotted hole 70. Thereafter a predetermined proportion of the reaction coming from push rod 64 is transmitted to the foot pedal lever depending upon the manner in which the various pivotal points of the levers have been arranged.

It is the function of the yieldable abutment device 90 to decrease the period through which no reaction is transmitted to the valve operating lever 14; and to substitute for this period a second stage reaction which will preferably be of a smaller magnitude than the reaction delivered to the valve lever 14 through the lost motion connection 68. The yieldable abutment device 90, shown, generally comprises a headed pin 92 slidably clamped between left and right sections of the force transmitting lever 16 by a pair of bolts 94. The front headed portion of the pin 92 is positioned adjacent the valve lever 14 so as to be capable of being abutted thereby, and a coil spring 96 is positioned between the head of the pin and the force transmitting members 16 to bias the pin in the direction of the valve lever 14. The back side of the pin 92 extends rearwardly of the lever 16, and is provided with an adjustment nut 98 for abutment with the sections of the lever 16 to provide a predetermined amount of clearance between the head of the pin and the valve lever 14 during the normal non-braking condition of the system.

Considering now the effect of the yieldable abutment device 90, initial reaction from the master cylinder compresses spring 74 to take up the clearance between the head of the pin 92 and the valve lever 14. During this initial stage of lever movement, no reaction is transmitted to the foot pedal lever of the vehicle. Continued movement of the lever 16 thereafter causes the head of the pin 92 to be biased against the valve lever 14 to provide a first stage of reaction to the valve lever 14. By reason of the yieldable abutment device 90 being positioned between pin 72 of the lost motion connection 68 and the support pin 40, the amount of reaction delivered to the valve lever 14 will be a smaller proportion of that delivered by the master cylinder than is subsequently transmitted by the lost motion connection 68. Yielding of the coil spring 96 during this first stage of reaction permits the pin 72 of the lost motion connection 68 to move forwardly in the slotted hole 70 until it abuts the forward end surface of the hole 70. Thereafter further movement of the lever 16 by the servo-motor causes reaction from the master cylinder to be delivered through pin 72 to the valve lever 14 providing the second stage of reaction against the valve lever 14 and in turn to the foot pedal lever of the vehicle.

Numerous modifications can of course be made to the device shown in the drawing. One such modification would be to substitute other means for biasing the lower end of the force transmitting lever 16 away from the valve lever 14, as for example a tension or compression spring interpositioned between the lever 16 and a fixed support such as the support bracket 10. Particular advantages, however, are achieved by positioning spring 74 between the levers, and further by positioning the line of force of this spring so it passes through the center of the support pin 40. By so doing none of the force transmitted by this spring will produce reaction upon the valve lever 14.

While the preferred embodiment has been shown and described in considerable detail, the invention is not limited to the particular construction shown or described, and it is my intention to cover hereby all adaptations, modifications and uses thereof which come within the practice of those skilled in the art to which the invention relates.

I claim:

1. In a system for power operating an automotive braking device and the like: a support; a driven member; a servo-motor; first and second generally parallel levers extending lengthwise in a first direction, said first lever having a pivoted connection at one of its ends to said support causing arcuate movement of said lever in first and second opposite lateral directions; first abutment means between said levers spaced at a point in said first lengthwise direction from said pivoted connection for transmitting force from said second lever to said first lever in said second lateral direction; second abutment means spaced in said first lengthwise direction from said first abutment means for transferring force in said first lateral direction from said second lever to said driven member; third abutment means spaced in said first lengthwise direction from said second abutment means for transmitting force from said servo-motor to said second lever in said first lateral direction; means biasing the portion of said second lever intermediate said second abutment means and said pivoted connection in said first lateral direction with generally predetermined force; and control means actuated by said first lever constructed and arranged when moved in said first lateral direction to cause said servomotor to move said second lever in said first lateral direction; whereby substantially no reaction force from said second lever opposes the initial actuation of said first lever in said first lateral direction, and thereafter a reactive force is delivered from said second lever to said first lever in said second lateral direction which is generally proportional to the force delivered to the driven member by the system.

2. In a system for power operating an automotive braking device and the like: a support; a driven member; a servo-motor; first and second generally parallel levers extending lengthwise in a first direction, said first lever having a pivoted connection at one of its ends to said support causing arcuate movement of said lever in first and second opposite lateral directions, first abutment means between said levers spaced at a point in said first lengthwise direction from said pivoted connection for transmitting force from said second lever to said first lever in said second lateral direction; second abutment means spaced in said first lengthwise direction from said first abutment means for transferring force in said first lateral direction from said second lever to said driven member; third abutment means spaced in said first lengthwise direction from said second abutment means for transmitting force from said servo-motor to said second lever in said first lateral direction; means biasing the portion of said second lever intermediate said second abutment means and said pivoted connection in said first lateral direction with generally predetermined force; control means actuated by said first lever constructed and arranged when moved in said first lateral direction to cause said servo-motor to move said second lever in said first lateral direction; stop means for limiting movement of said second lever in said second lateral direction; and means biasing said first lever in said second lateral direction to a position releasing said control means; whereby substantially no reaction force from said second lever opposes the initial actuation of said first lever in said first lateral direction, and thereafter a reactive force is delivered from said second lever to said first lever in said second lateral direction which is generally proportional to the force delivered to the driven member by the system.

3. In a system for power operating a driven automotive braking device and the like: a servo-motor; a control device for said servo-motor; a first lever arrangement; means operatively connecting said first lever arrangement to said control device and causing said servo-motor to be actuated when moved in a first direction; a driven member; a second lever arrangement for transmitting force to the driven member and having a first portion operatively connected to said servo-motor for movement thereby, said second lever arrangement also having a second portion for opposing servo-motor actuating movement of said first lever arrangement; abutment means for transmitting reactive force from said second portion of said second lever arrangement to said first lever arrangement; yieldable means for transferring reactive force from said second portion of said second lever arrangement to said first lever arrangement; and means causing said abutment means to be normally biased out of its reactive force transmitting conditions; whereby movement of said system from its at rest position causes reactive force to be transmitted to said first lever arrangement through said yieldable means, and subsequent movement of said system causes reactive force to be transmitted to said first lever arrangement through said abutment means.

4. In a system for power operating an automotive braking device and the like: a support; a driven member; a servo-motor; first and second generally parallel levers extending lengthwise in a first direction, said first lever having a pivoted connection at one of its ends to said support causing arcuate movement of said lever in first and second opposite lateral directions; first pin means connecting said levers at a point spaced in said first lengthwise direction from said pivoted connection for supporting said second lever and for transmitting force from said second lever to said first lever in said second lateral direction; second abutment means spaced in said first lengthwise direction from said first abutment means for transferring force in said first lateral direction from said second lever to said driven member; third abutment means spaced in said first lengthwise direction from said second abutment means for transmitting force from said servo-motor to said second lever in said first lateral direction; means biasing the portion of said second lever intermediate said second abutment means and said pivoted connection in said first lateral direction with generally predetermined force; and control means actuated by said first lever constructed and arranged when moved in said first lateral direction to cause said servo-motor to move said second lever in said first lateral direction, whereby substantially no reaction force from said second lever opposes the initial actuation of said first lever in said first lateral direction, and thereafter a reactive force is delivered from said second lever to said first lever in said second lateral direction which is generally proportional to the force delivered to the driven member by the system.

5. In a system for power operating a driven automotive braking device and the like: a servo-motor; a control device for said servo-motor; a first lever supported for arcuate movement about a first point; means operatively connecting said first lever to said control device and causing said servo-motor to be actuated when moved in a first direction; a driven member; a second lever arrangement for transmitting force to the driven member and having a first portion operatively connected to said servo-motor for movement thereby, said second lever arrangement also having a second portion for opposing servo-motor actuating movement of said first lever; abutment means operatively positioned between said second portion of said second lever arrangement and a point on said first lever spaced apart from said first point for transmitting reactive force from said second portion of said second lever arrangement to said first lever, yieldable means spaced apart from said abutment means for transferring reactive force from said second portion of said second lever arrangement to said first lever; and means causing said abutment means to be normally biased out of its reactive force transmitting condition; whereby movement of said system from its at rest position causes reactive force to be transmitted to said first lever through said yieldable means only, and subsequent movement of said system causes reactive force to be transmitted to said first lever through said abutment means.

6. In a system for power operating an automotive braking device and the like: a support; a driven member; a servo-motor; first and second generally parallel levers extending lengthwise in a first direction, said first lever having a pivoted connection at one of its ends to said support causing arcuate movement of said lever in first and second opposite lateral directions; first pin means connecting said levers at a point spaced in said first lengthwise direction from said pivoted connection for supporting said second lever and for transmitting force from said second lever to said first lever in said second lateral direction; second abutment means spaced in said first lengthwise direction from said first abutment means for transferring force in said first lateral direction from said second lever to said driven member; third abutment means spaced in said first lengthwise direction from said second abutment means for transmitting force from said servo-motor to said second lever in said first lateral direction; means biasing the portion of said second lever intermediate said second abutment means and said pivoted connection in said first lateral direction with generally predetermined force; control means actuated by said first lever constructed and arranged when moved in said first lateral direction to cause said servo-motor to move said second lever in said first lateral direction; stop means spaced between said second and third abutment means for limiting movement of said second lever in said second lateral direction; and means biasing said first lever in said second lateral direction to a position releasing said control means; whereby substantially no reaction force from said second lever opposes the initial actuation of said first lever in said first lateral direction, and thereafter a reactive force is delivered from said second lever to said first lever in said second lateral direction which is generally proportional to the force delivered to the driven member by the system.

7. In a system for power operating a driven automotive braking device and the like: a servo-motor; a control device for said servo-motor; a first lever supported for arcuate movement about a first point; means operatively connecting said first lever to said control device and causing said servo-motor to be actuated when moved in a first direction; a driven member; a second lever arrangement for transmitting force to the driven member and having a first portion operatively connected to said servo-motor for movement thereby, said second lever arrangement also having a second portion for opposing servo-motor actuating movement of said first lever; abutment means operatively positioned between said second portion of said second lever arrangement and a point on said first lever spaced apart from said first point for transmitting reactive force from said second portion of said second lever arrangement to said first lever, yieldable means spaced apart from said abutment means for transferring reactive force from said second portion of said second lever arrangement to said first lever; and spring means causing both said yieldable means and said abutment means to be normally biased out of their reactive force transmitting condition; whereby the initial movement of said system from its at rest position causes practically no reactive force to be transmitted to said first lever, the next stage of movement of said system transfers a first stage of reaction through said yieldable means, and subsequent movement of said system causes reactive force to be transmitted to said first lever through said abutment means.

8. In a system for power operating an automotive braking device and the like: a support; a driven member; a servo-motor; first and second generally parallel levers extending lengthwise in a first direction, said first lever having a pivoted connection at one of its ends to said support causing arcuate movement of said lever in first and second opposite lateral directions; first abutment means between said levers spaced at a point in said first lengthwise direction from said pivoted connection for transmitting force from said second lever to said first lever in said second lateral direction; second abutment means spaced in said first lengthwise direction from said first abutment means for transferring force in said first lateral direction from said second lever to said driven member; third abutment means spaced in said first lengthwise direction from said second abutment means for transmitting force from said servo-motor to said second lever in said first lateral direction; yieldable abutment means spaced between said pivoted connection and said first abutment means for transferring force from said second lever to said first lever in said second lateral direction; means biasing the portion of said second lever intermediate said second abutment means and said pivoted connection in said first lateral direction with generally predetermined force; and control means actuated by said first lever constructed and arranged when moved in said first lateral direction to cause said servo-motor to move said second lever in said first lateral direction; whereby movement of said system from its at rest position causes reactive force to be transmitted to said first lever through said yieldable means only, and subsequent movement of said system causes reactive force to be transmitted to said first lever through said first abutment means.

9. In a system for power operating a driven automotive braking device and the like: a servo-motor; a control device for said servo-motor; a first lever supported for arcuate movement about a first point; means operatively connecting said first lever to said control device and causing said servo-motor to be actuated when moved in a first direction; a driven member; a second lever for transmitting force from the servo-motor to the driven member and for providing a reaction against said first lever; a lost motion connection for transmitting reaction to said first lever operatively connecting a point intermediate the ends of said second lever to a second point on said first lever spaced apart from said first point; a spring biasing the lost motion connection out of its reactive force transmitting condition; yieldable force transmitting means interpositioned between said first and second levers and acting on a line of force positioned between said first and second points; whereby reaction from the driven device is transmitted to said first lever in stages, one of said stages being transmitted through said lost motion connection, and another of said stages being a smaller proportion of the reactive force of the driven device and being transmitted through said yieldable means.

10. In a system for power operating a driven automotive braking device and the like: a servo-motor; a control device for said servo-motor; a first lever supported for arcuate movement about a first point; means operatively connecting said first lever to said control device and causing said servo-motor to be actuated when moved in a first direction; a driven member; a second lever for transmitting force from the servo-motor to the driven member and for providing a reaction against said first lever; a lost motion connection for transmitting reaction to said first lever operatively connecting a point intermediate the ends of said second lever to a second point on said first lever spaced apart from said first point; yieldable force transmitting means interpositioned between said first and second levers and acting on a line of force positioned between said first and second points, said yieldable means also having a lost motion connection; a spring biasing said lost motion connections out of their reactive force transmitting condition; whereby the initial movement of said system from its at rest position causes practically no reactive force to be transmitted to said first lever by reason of said lost motion connections, the next stage of movement transfers a first stage of reaction through said yieldable means, and subsequent movement of said system causes reactive force to be transmitted to said first lever through said lost motion connection.

References Cited in the file of this patent

UNITED STATES PATENTS

| | | |
|---|---|---|
| 1,865,817 | Berry | July 5, 1932 |
| 2,265,546 | Price | Dec. 9, 1941 |
| 2,784,702 | Ayers | Mar. 12, 1957 |